United States Patent

Shiga et al.

[11] Patent Number: 5,881,446
[45] Date of Patent: Mar. 16, 1999

[54] METHOD OF MANUFACTURING AN ELECTRIC ROTATING MACHINE

[75] Inventors: Tsutomu Shiga, Nukata; Nobuyuki Hayashi, Nagoya; Masanori Ohmi, Anjo; Masami Niimi, Handa, all of Japan

[73] Assignee: Nippondenso Co., Ltd., Kariya, Japan

[21] Appl. No.: 840,911

[22] Filed: Apr. 18, 1997

Related U.S. Application Data

[62] Division of Ser. No. 369,073, Jan. 5, 1995, Pat. No. 5,679,994.

[30] Foreign Application Priority Data

Oct. 5, 1994 [JP] Japan .................................. 6-241139

[51] Int. Cl.⁶ .................................................. H02K 15/14
[52] U.S. Cl. .............................. 29/596; 310/42; 310/154
[58] Field of Search ........................... 29/595, 596, 598; 310/42, 89, 154, 156

[56] References Cited

U.S. PATENT DOCUMENTS

| | | | |
|---|---|---|---|
| 4,372,035 | 2/1983 | McMillen | 29/596 |
| 4,707,630 | 11/1987 | Tomite et al. | 310/154 |
| 4,850,100 | 7/1989 | Stokes | 29/596 |
| 5,105,114 | 4/1992 | Sickle et al. | 310/154 |
| 5,201,111 | 4/1993 | Prohaska | 29/596 |
| 5,475,276 | 12/1995 | Shiga et al. | 310/154 |

FOREIGN PATENT DOCUMENTS

| | | |
|---|---|---|
| 61-10950 | 1/1986 | Japan . |
| 61-218349 | 9/1986 | Japan . |
| 61170260 | 12/1986 | Japan . |

OTHER PUBLICATIONS

Patent Abstract of Japan, vol. 16, No. 279 (E–1220), Jun./1992 re JP-A 04067756.
Patent Abstract of Japan, vol. 11, No. 59 (E–482) [2506] Feb./1987 re JP-A 61218349.
Patent Abstract of Japan, vol. 10, No. 150 (E–408) [2207] May/1986 re JP-A 61010950.
Patent Abstract of Japan, vol. 11, No. 27 (E–474) [2474] Jan./1987 re JP-A 61196747.
Patent Abstract of Japan, vol. 10, No. 379 (E–465) [2436] Dec./1986 re JP-A 611702060.

*Primary Examiner*—Carl E. Hall
*Attorney, Agent, or Firm*—Pillsbury Madison & Sutro LLP

[57] ABSTRACT

An electric rotating machine and manufacturing method of the same is provided that can securely press-fit magnetic poles against an inner circumference of a yoke with a cylindrical body. By directly contacting a first and second end portions of the cylindrical body and moving the same relatively, the diameter of the cylindrical body widens in the outer radial direction to press-fit the magnetic poles against the inner circumference of the yoke. Thus, the variation of the inner diameter of the magnetic poles that occurs due to the dimensional error in permanent magnet thickness and inner diameter of the yoke is absorbed by the relative movement of the first and second end portions. This stabilizes the fixing force of the magnet, and allows the magnet to be securely fixed to the yoke without excessive stress on the cylindrical body. Furthermore, the displacement of the magnetic poles can be restricted by bending axial ends of the cylindrical body radially outwardly.

18 Claims, 4 Drawing Sheets

METHOD OF MANUFACTURING AN ELECTRIC ROTATING MACHINE

This is a division of application Ser. No. 08/369,073 filed Jan. 5, 1995, now U.S. Pat. No. 5,679,994.

CROSS REFERENCE TO RELATED APPLICATION

This application is based upon and claims priority of Japanese Patent Application No. 6-241139 filed Oct. 5, 1994, the content of which is incorporated herein by reference.

BACKGROUND OF THE INVENTION

1. Field of the Invention

The present invention relates to an electric rotating machine for starter motor and a manufacturing method of the same. More particularly, the present invention relates to a stator structure and its manufacturing method.

2. Related Art

It is known, by Japanese Laid-open Patent No. 61-10950, to manufacture a stator of an electric rotating machine by a method of fixing permanent magnets as magnetic poles onto a yoke by rounding an elastic copper band to a cylindrical body and butting it in the circumferential end and pressing it in, to fix the permanent magnets onto the inner circumference of the yoke.

With the conventional structure and method, the circumferential end portion of the cylindrical body is butted and projected between the space between the permanent magnets. The inner diameter of the magnetic poles fluctuates according to the magnet thickness and dimensional error of the inner diameter of the yoke, so the tension force of the butt portion may be insufficient, the pressing force of the magnet onto the yoke by the cylindrical body may drop, and the stress of the portion projected between the permanent magnets may become excessive.

SUMMARY OF THE INVENTION

In view of the above problem, the present invention has a primary object to provide an electric rotating machine in which permanent magnets as magnetic poles are accurately press-fit to an inner circumference of a cylindrical yoke by a cylindrical body, and to provide a manufacturing method of the same.

According to the present invention, a first and second end portions of a cylindrical body are directly contacted to each other and moved relatively in a generally axial direction so that a diameter of the cylindrical body widens in an outer radial direction to press-fit permanent magnets as magnetic poles to a cylindrical yoke. Thus, fluctuation of the inner diameter of the magnetic poles that occurs due to the dimensional error in the magnet thickness and inner diameter of the yoke is absorbed by the relative movement of the first and second end portions. This stabilizes the permanent magnet's fixing force, and allows the permanent magnets to be securely fixed without excessive stress on the cylindrical body.

Preferably, the axial end portion of the cylindrical body is bent radially outwardly toward the magnet side so that the permanent magnets can be securely fixed to the yoke.

Preferably, at least one of the first and second end portions is shaped in an arc form to reduce the direct contact length of the first and second end portions, while securely widening the diameter of the cylindrical body.

Preferably, by the arc shape of one of the first and second end portions, the first and second end portions can be directly contacted near the center of the axis line of the other of the first and second end portions. Thus, the torsion of the cylindrical body during assembly is reduced, and the circumferential tension force is stabilized.

More preferably, a guide portion is formed in the first end portion to prevent protrusion of the second end portion in the inner circumferential direction.

More preferably, the first end portion is bent for the guide portion so that the number of component parts does not increase, and manufacturing cost is made inexpensive.

DETAILED DESCRIPTION OF THE PRESENTLY PREFERRED EMBODIMENTS

Figure 1:
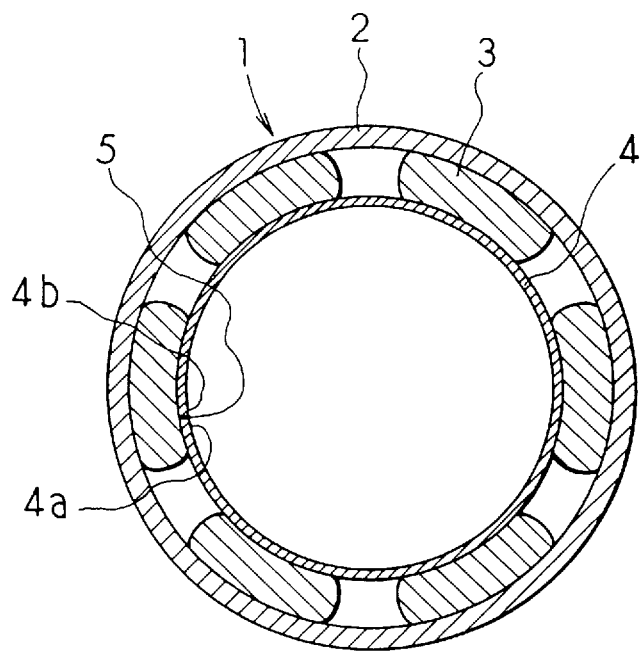
FIG. 1 is a cross-sectional view illustrating a stator of an electric rotating machine according to the first embodiment of the present invention.

The present invention will be described in detail with reference to various embodiments illustrated in the drawings in which only stator structures of an electric rotating machine are illustrated for brevity and same reference numerals are used to designate the same or like parts.

Figure 2:
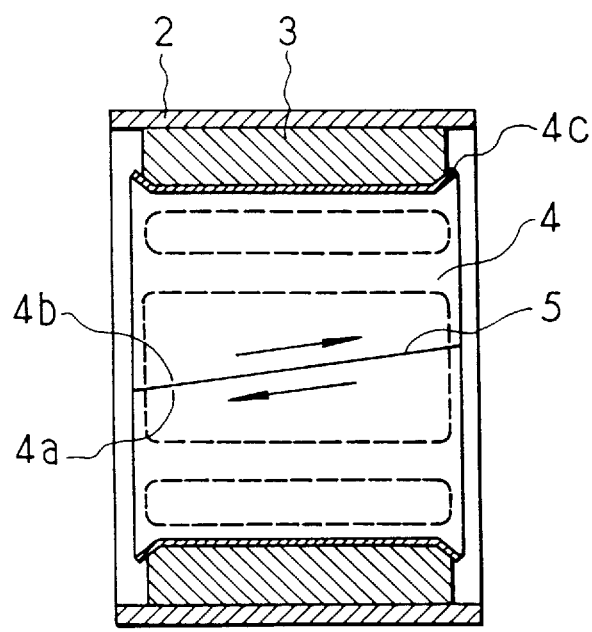
FIG. 2 is a side cross-sectional view illustrating the stator illustrated in FIG. 1.

The first embodiment of the present invention illustrated in FIGS. 1 and 2. In a stator of an electric rotating machine 1, a plurality of magnetic poles 3 composed of permanent magnets are set in an inner circumference of a cylindrical yoke 2. A cylindrical body 4 is set at an inner circumference of the magnetic poles 3 circumferentially and press-fits the magnetic poles 3 to the inner circumference of the cylindrical yoke 2. The cylindrical body 4 is formed by rounding band-shaped sheet metal having sloped or inclined free ends, a first and second end portions 4a and 4b. As shown in FIG. 2, the first and second end portions 4a and 4b in the circumferential direction of the cylindrical body 4 are directly contacted by butting, and are formed in a shape to inversely incline or slope toward a yoke axial line. The butting portion 5 of the first and second end portions 4a and 4b directly contact the inner circumference of the magnetic poles 3 when butted, and deviation and removal in the outer circumferential direction are prevented during butting.

Next, an assembly method or manufacturing method of the stator according to the present invention will be explained. After setting the multiple magnetic poles 3 on the inner circumference of the yoke 2 at a specified pitch, the cylindrical body 4 made of the band-shaped metal having inclined free ends and rounded to be slightly larger than the inner diameter of the magnetic poles 3 is inserted in the axial direction so that the first and second end portions 4a and 4b directly contact each other. While directly contacting the first and second end portions 4a and 4b and shifting or sliding the cylindrical body 4 in the axial direction (direction of arrow shown in FIG. 2), the diameter of the cylindrical body 4 widens, and securely press-fits the magnetic poles 3 against the inner circumference of the yoke 2. After an adequate tension force is given to the cylindrical body 4, the axial end portions 4c are bent radially outwardly toward the magnetic poles 3. This positions the magnetic poles 3 in the axial direction and securely fixes them to the yoke 2.

Since the cylindrical body 4 is formed by rounding band-shaped sheet metal and the first and second end portions 4a and 4b are contacted in the circumferentially rounded state, the magnetic poles 3 are securely press-fit to the inner circumference of the yoke 2 when the cylindrical body diameter is widened by shifting the end portions 4a and 4b in the axial direction. Thus, the variations in the inner diameter of the magnetic poles 3 that occurs due to the dimensional error in the permanent magnet thickness and inner diameter of the yoke 2 is tolerated or absorbed by the adjustment of the contact of the first and second end portions 4a and 4b. Thus, an excessive stress is not applied on the cylindrical body 4, and the magnetic poles 3 can be securely fixed to the yoke 2. As the band-shaped sheet metal is used for the cylindrical body 4, there are cost-wise advantages.

Furthermore, as plasticity machining to project the cylindrical body 4 between the magnetic poles 3, material with a small elongation and large strength can be used, thereby increasing the fixing strength of the magnetic poles 3. This is advantageous for the electric rotating machine used in automotive starters, etc., which require a high vibration-resistance.

Furthermore, as the absorption effect of the dimensional error in the inner diameter of the magnetic poles 3 caused by errors in the permanent magnetic thickness or the like and inner diameter of the yoke 2, etc., is large, the error standards can be further relaxed, and the parts costs can be reduced greatly. Furthermore, adhesives can be used to fix the magnetic poles 3 to the yoke 2 in this embodiment.

Figure 3:
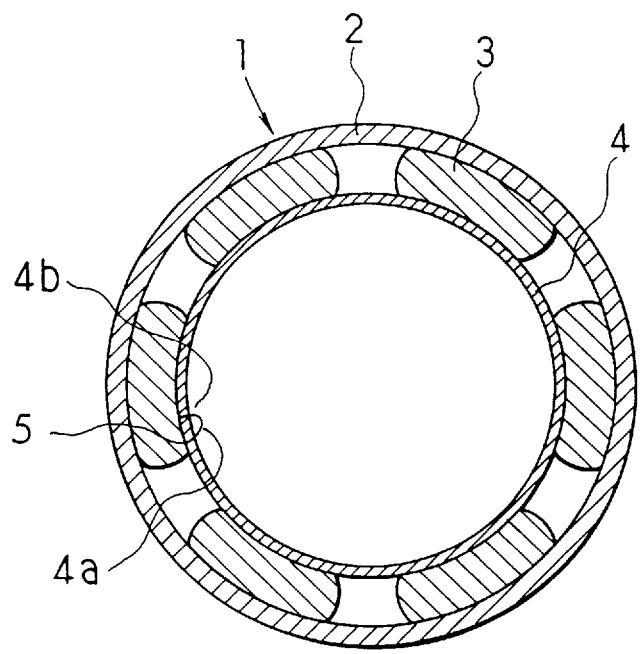
FIG. 3 is a cross-sectional view illustrating a stator according to the second embodiment.
Figure 4:
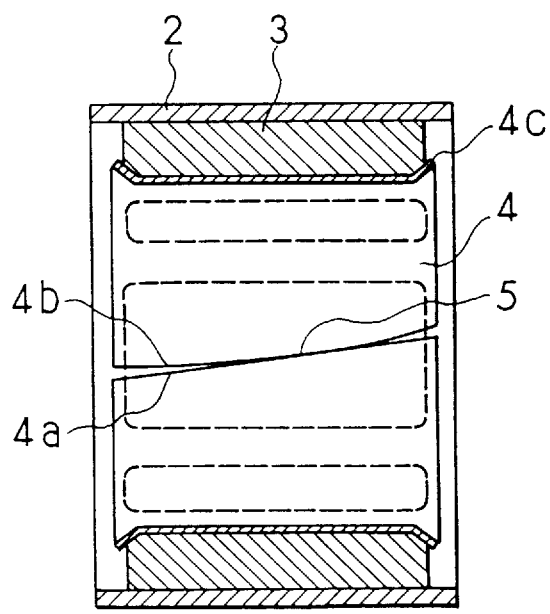
FIG. 4 is a side cross-sectional view illustrating the stator illustrated in FIG. 3.

The second embodiment is illustrated in FIGS. 3 and 4. Of the first and second end portions 4a and 4b of the cylindrical body 4, the first end portion 4a is formed in a linear or straight shape and the second end portion 4b is formed as an inclined arc shape. By forming the second end portion 4b as an arc shape, the position that the second end portion 4b directly contacts the first end portion 4a is near the center of the axial direction of the first end portion 4a. Thus, the torsion of the cylindrical body 4 during assembly is reduced, and the circumferential tension force is made stable.

In this embodiment, the first end portion 4a is formed as a linear shape, but this portion can be formed in an arc shape as with the second end portion 4b, and the position that the second end portion 4b directly contacts the first end portion 4a can be near the center of the axial direction of the first end portion 4a as well.

Figure 5:
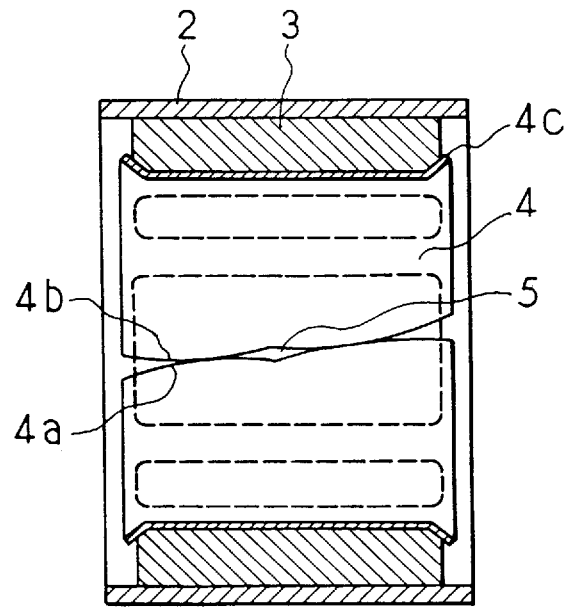
FIG. 5 is a cross-sectional view illustrating a modification of the stator illustrated in FIG. 3.

In the above embodiment, an arc shape is used for the first or second end portion 4a or 4b so that it will project near the center of the axial direction. However, as illustrated in FIG. 5, two arc shapes can be formed for the first or second end portion 4a or 4b so that the first and second end portions 4a and 4b directly contact each other only partly, at the two direct contact positions instead of near the center of the axial direction. It is to be noted that two or more random contact positions cannot be formed.

Figure 6:
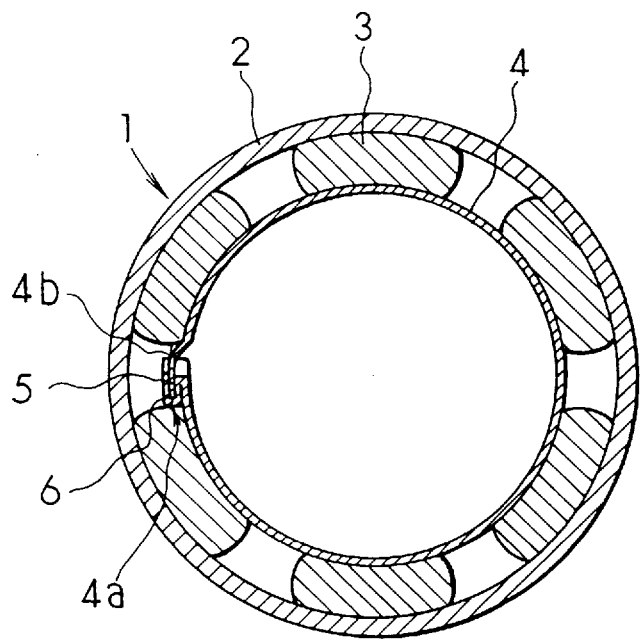
FIG. 6 is a cross-sectional view illustrating a stator according to the third embodiment.
Figure 7:
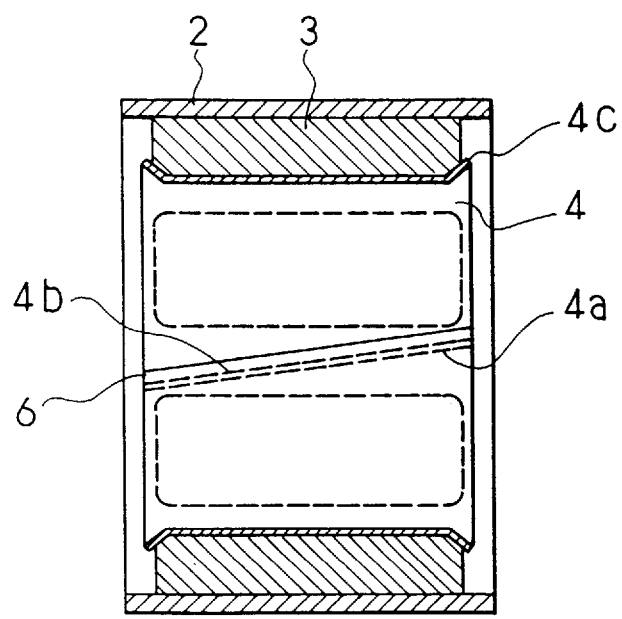
FIG. 7 is a side cross-sectional view illustrating the stator illustrated in FIG. 6.

FIGS. 6 and 7 illustrate the third embodiment of the present invention. A fold-back portion 6 that acts as a U-shaped guide portion is formed by bending the first end portion 4a of the cylindrical body 4. The second end portion 4b is sandwiched by this fold-back portion 6. This allows the displacement of the butt portion 5 in the inner and outer circumferential directions, and allows the magnetic poles 3 to be firmly fixed. In this case, the fold-back potion 6 prevents the magnetic poles 3 from projecting from the inner surface, and thus is placed between two adjacent magnetic poles 3.

Figure 8:
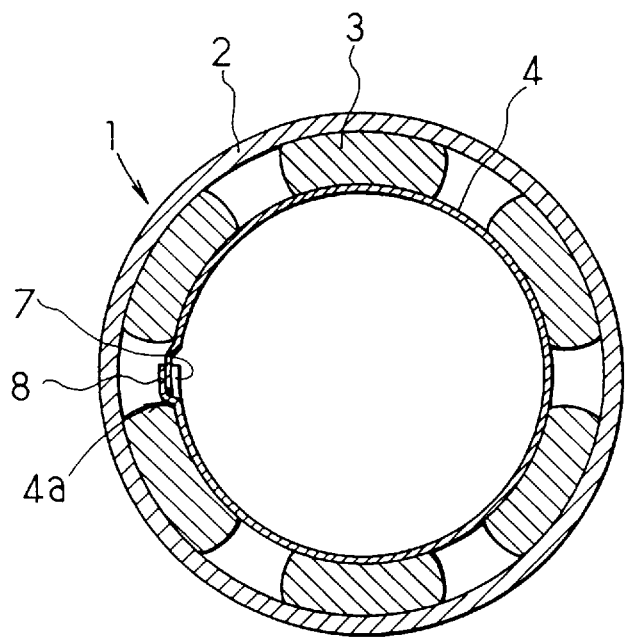
FIG. 8 is a cross-sectional view illustrating a stator according to the fourth embodiment.
Figure 9:
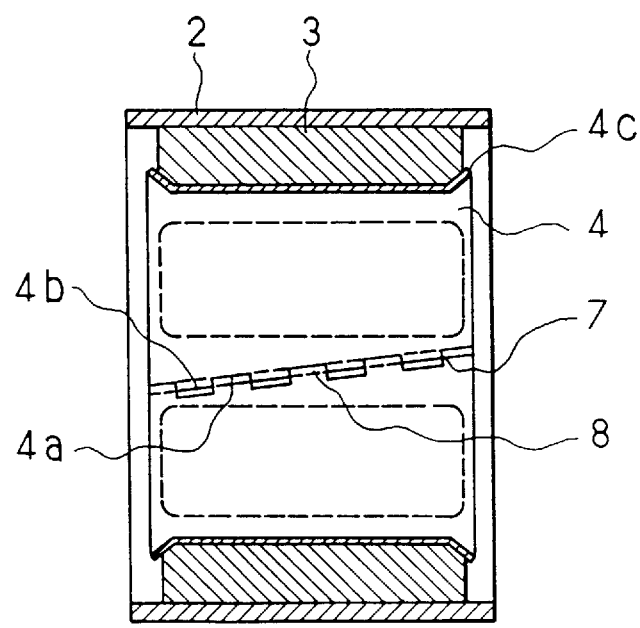
FIG. 9 is a cross-sectional view illustrating the stator illustrated in FIG. 8.

FIGS. 8 and 9 illustrate the fourth embodiment of the present invention. Multiple grooves or cut portions 7 are cut on the free end of the first end portion 4a, and the U-shaped guide portion similar to the third embodiment is structured with the multiple bend portions 8 formed between the grooves 7. This allows the radial direction thickness of the fold-back portion in the third embodiment to be reduced.

The present invention has been described with reference to the presently preferred embodiments. However, it should be understood that the foregoing description is not restrictive and the present invention may be modified in many ways without departing from the scope and spirit of the invention.

What is claimed is:

1. A manufacturing method for an electric rotating machine comprising the steps of:

placing a plurality of magnetic poles on an inner circumference of a cylindrical yoke of an electric rotating machine;

placing in an inner circumference of said magnetic poles a cylindrical body formed in a shape having a first and second end portions inclined with respect to an axial end thereof; and moving at least one of said first and second end portions relative to the other in generally an axial direction of said yoke, while contacting said first end portion with said second end portion to enlarge a diameter of said cylindrical body and thereby to press-fit said magnetic poles onto said inner circumference of said yoke.

2. The manufacturing method for an electric rotating machine according to claim 1 further comprising the step of:

bending, after said moving step, an axial end of said cylindrical body radially outwardly toward said magnetic poles to restrict axial displacement of said magnetic poles.

3. A manufacturing method for an electric rotating machine comprising the steps of:

placing a plurality of magnetic poles on an inner circumference of a cylindrical yoke of an electric rotating machine;

providing a band-shaped body formed in a shape having first and second end portions inclined with respect to a longitudinal axis thereof;

forming at least one of said first end portion and said second end portion in an arc-shape;

forming said band-shaped body into a generally cylindrical body and placing said generally cylindrical body in an inner circumference of said magnetic poles;

moving at least one of said first and second end portions relative to the other in generally an axial direction of said yoke, while contacting said first end portion with said second end portion to press-fit said magnetic poles onto said inner circumference of said yoke.

4. The manufacturing method for an electric rotating machine according to claim 3, comprising forming said first end portion in a linear shape, and forming said second end portion in said arc shape, said second end portion contacting said first end portion near a center of said first end portion.

5. A manufacturing method for an electric rotating machine comprising the steps of:

placing a plurality of magnetic poles on an inner circumference of a cylindrical yoke of an electric rotating machine;

placing in an inner circumference of said magnetic poles a cylindrical body formed in a shape having a first and second end portions inclined with respect to an axial end thereof; and moving at least one of said first and second end portions relative to the other in generally an axial direction of said yoke, while contacting said first end portion with said second end portion to press-fit said magnetic poles onto said inner circumference of said yoke, wherein said first end portion has a guide portion to sandwich and guide said second end portion.

6. The manufacturing method for an electric rotating machine according to claim 5, wherein said guide portion is formed by bending said first end portion in a U-shape, and is placed between adjacent two of said magnetic poles.

7. The manufacturing method for an electric rotating machine according to claim 5, wherein said first end portion is formed with a plurality of cut portions.

8. The manufacturing method for an electric rotating machine according to claim 1, wherein said first end portion and said second end portion are placed radially inside said inner circumference of one of said magnetic poles.

9. The manufacturing method for an electric rotating machine according to claim 1, wherein said magnetic poles are arranged circumferentially with spaces between adjacent two of said magnetic poles, and said cylindrical body extends circumferentially at a substantial uniform radius at said magnetic poles and said spaces.

10. The manufacturing method for an electric rotating machine according to claim 1, wherein an axial position of said first end portion and said second end portion are set so that all of said magnetic poles tightly contact said yoke and said cylindrical body.

11. A manufacturing method for an electric rotating machine comprising the steps of:

placing a plurality of permanent magnets on an inner circumference of a cylindrical yoke of an electric rotating machine;

rounding into a cylindrical body a band-shaped metal having a first end portion and second end portion at axial ends thereof and inclined with respect to an axial center thereof, while contacting said first end portion and said second end portion, said cylindrical body having a diameter slightly larger than an inner diameter of said permanent magnets when said first end portion and said second end portion are in contact alignment in an axial direction of said cylindrical body;

placing said cylindrical body in an inner circumference of said magnetic poles while maintaining said diameter of said cylindrical body smaller than said inner diameter of said permanent magnets; and moving at least one of said first and second end portions relative to the other in generally an axial direction of said yoke, while maintaining contact between said first end portion and said second end portion, to enlarge said diameter of said cylindrical body and press-fit said magnetic poles onto said inner circumference of said yoke.

12. The manufacturing method according to claim 11 further comprising the step of:

shaping at least one of said first and second end portions in an arc shape protruding in an axial direction of said band-shaped metal at a position other than lateral edges of said band-shaped metal.

13. The manufacturing method according to claim 12, wherein:

the arc shape is provided on only one of said first and second end portions; and the other of said first and second end portions is shaped linearly.

14. The manufacturing method according to claim 12, wherein:

said at least one of said first and second end portions is shaped to define a plurality of arc shapes.

15. The manufacturing method according to claim 13, wherein:

both of the first and second end portions are shaped in an arc shape.

16. The manufacturing method according to claim 11, wherein:

said moving step comprises moving said first and second end portions on an inner circumferential surface of one of said magnetic poles.

17. The manufacturing method according to claim 11, further comprising, after said moving step, the step of:

bending solely lateral ends of said cylindrical body radially outwardly toward said magnetic poles to restrict axial displacement of said magnetic poles.

18. A manufacturing method for an electric rotating machine comprising the steps of:

placing a plurality of magnets on an inner circumference of a cylindrical yoke of an electric rotating machine with a spacing between circumferentially adjacent two of said magnets;

rounding a band-shaped metal having a first end portion and a second end portion at axial ends thereof and inclined with respect to an axial center thereof into a cylindrical body, said band shaped metal having an axial length longer than a circumferential length of a circle formed by radially inner surfaces of said magnets;

placing said cylindrical body radially inside said magnets with said first and second end portions being placed movably on the inner surface of one of said magnets; and causing a relative movement between said first and second end portions on said inner surface of said one magnet in an axial direction of said cylindrical body thereby to enlarge a diameter of the cylindrical body while maintaining contact between said first and second end portions.

* * * * *